Sept. 9, 1952 S. C. COLLINS 2,610,046
RECTIFYING APPARATUS
Filed May 24, 1948
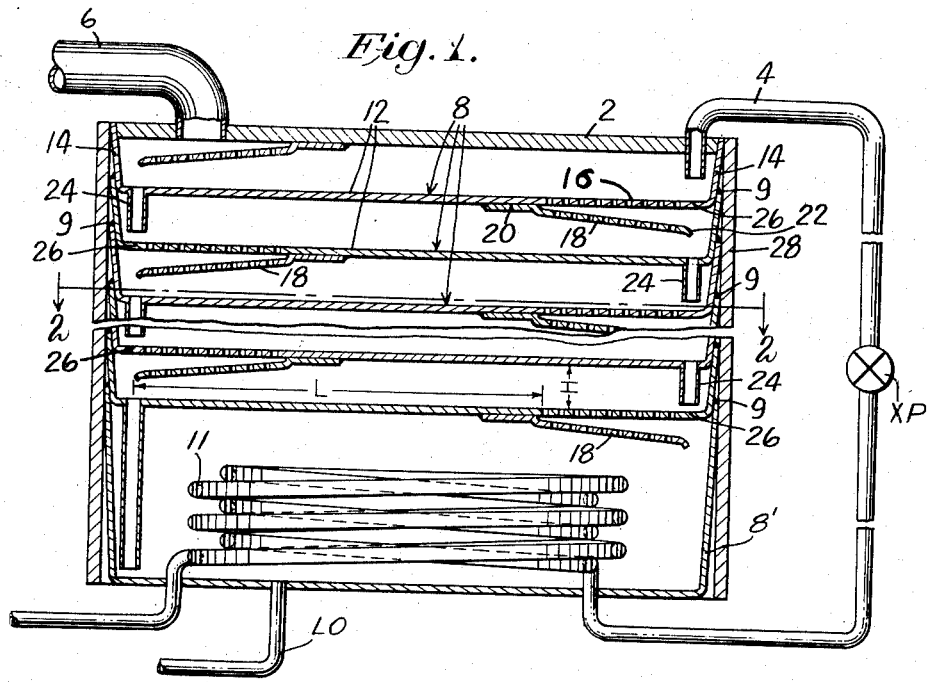
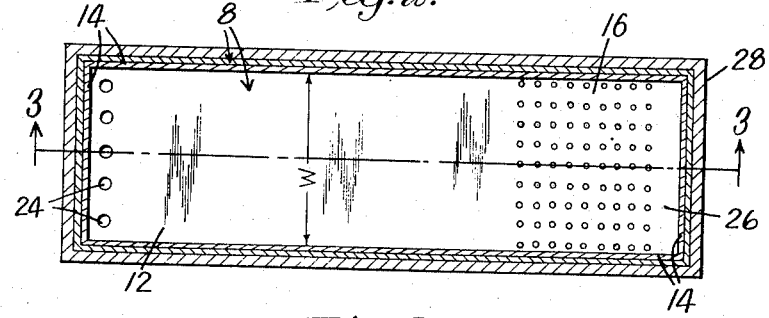
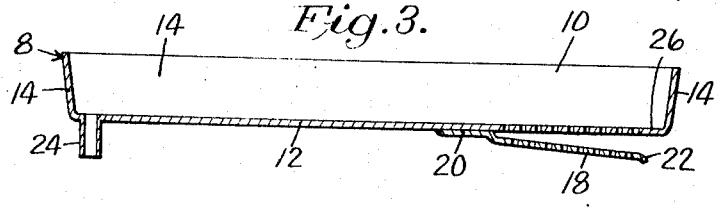
Inventor:
Samuel C. Collins.
by John F. Schmidt
atty Patented Sept. 9, 1952

2,610,046

UNITED STATES PATENT OFFICE 2,610,046

RECTIFYING APPARATUS

Samuel C. Collins, Watertown, Mass., assignor to Joy Manufacturing Company, Pittsburgh, Pa., a corporation of Pennsylvania Application May 24, 1948, Serial No. 28,870

12 Claims. (Cl. 261—113)

This invention relates to rectifying or fractionating apparatus, especially to a rectifying column of the vertically spaced tray type.

Although the invention is not necessarily limited in its application to the separation of air, it is originally and specifically applied to an air fractionating system for oxygen generation, of the so-called Linde simple or single column type, as will be well understood by those skilled in the art, and as is set forth in chapter VI of The Separation of Gases, by M. Ruhemann, Oxford University Press, 1945, first published in 1940.

One of the chief problems in connection with fractionation is that of obtaining close contact between liquid and vapor. The liquid tends to form in either too large particles, preventing close contact, or in too small particles, resulting in entrainment thereof with the vapor. The problem is to obtain good contact, and at the same time effective separation of liquid and vapor and a proper balance of flow of the two phases.

It is an object of this invention to provide an improved rectifying column in which the liquid and vapor phases are brought into close contact, with a minimum of entrainment of the liquid phase by the vapor phase. It is another object of this invention to provide a fractionating column in which counterflowing vapor and liquid phases are brought into intimate contact but may still be effectively separated. These and other objects are accomplished in a rectifying or fractionating column in which a plurality of vertically stacked trays permit a general downward flow of liquid and upward flow of vapor, but in flowing in these general directions, the liquid and vapor cross back and forth from one side of the column to the other. Each tray is perforated at one end to permit upward flow of vapor, and is provided with liquid passages at its opposite end. The trays are stacked so that the perforated ends alternate with the liquid drain ends. A baffle is associated with the perforated end to substantially prevent the entrainment of liquid by the upwardly moving vapor.

In the drawings:

Fig. 1 is a vertical longitudinal section through a column embodying the invention.

Fig. 2 is a view in section on the plane of line 2—2 of Fig. 1, and

Fig. 3 is a view in section on the plane of line 3—3 of Fig. 2.

The rectifying or fractionating column is shown as being enclosed at the top by a cover member 2, into which liquid is introduced through a conduit 4 and from which vapor leaves by way of a conduit 6. In an oxygen generator, the vapor leaving by way of conduit 6 consists of waste gases, mostly nitrogen. Numerous trays, indicated generally at 8, are shown as being stacked in vertically spaced relationship, and are soldered together as at 9 to form a hermetically sealed column. The bottom tray, 8', is shown as being deeper than the trays 8 to provide space for a boiler-condenser. The boiler-condenser or tray 8' collects liquid, which in an air fractionating system is oxygen.

A coil 11 is disposed in the bottom of the column to complete the boiler-condenser. In an air fractionating system, air flows through coil 11 and is condensed therein, after which it passes into the top of the column by way of an expansion valve XP and conduit 4, as is well understood by those skilled in the art and as is clearly brought out in Ruhemann, above.

Oxygen product may be removed from the column in either the liquid or the vapor state; in this embodiment, I have shown a liquid outlet LO.

Each tray 8 comprises a shallow elongated pan member 10 having a bottom 12 and sloping raised sides 14. Near one end of each tray, there are provided numerous small perforations forming a perforated portion 16. At the underside of the bottom 12 of the tray, there is provided a baffle 18 consisting of a flat, preferably perforated member having one edge 20 secured to the pan adjacent the inner edge of the perforated portion 16 and extending outward beyond the outer edge of the perforated portion. The outer edge 22 of the baffle is spaced vertically from the outer edge of the pan bottom 12.

At the end opposite the perforated end, there is provided one or more liquid drains 24. In the preferred form, there are several such liquid drains, as shown in Fig. 2, and they are preferably aligned along an axis normal to the long axis of the tray, again as shown in Fig. 2.

As arranged in the column the trays are spaced vertically in a nested relationship, the bottom of one tray being supported in the top of the next tray below. The trays are arranged or stacked so that the liquid drain of one tray empties into the perforated end of the next tray below, but it should be noted that the relationship of the drains and perforations is such that the extreme outer end 26 of the tray adjacent the perforations is itself imperforate in order that the liquid drains will not empty immediately onto a perforated portion of the pan bottom. This is best seen in Fig. 1.

As is also best seen in Fig. 1, the innermost edge of the perforated portion of each tray is close to the end of the tray—i. e., does not approach the middle of the tray—with the result that, in the stacked trays, there is a substantial length of imperforate tray bottom between the inner edge of the perforated portion of one tray and the inner edge of the perforated portion of the next adjacent tray. The result of this arrangement and structure is that the vapor rising in the column is not permitted to go almost straight up from one perforated portion to another, but must travel a substantial distance horizontally as well as vertically, thus giving entrained droplets of liquid a chance to drop out.

Although the invention may be practiced within rather wide variations of tray proportions, a suggested preferred form is one in which the length of the horizontal vapor path on which gravity may act to remove entrained liquid (i. e., the length of the tray from the inner edge of the perforated portion to the tip of the baffle of the next above tray—the dimension L of Fig. 1) is at least five times the vertical distance between trays (the dimension H of Fig. 1); also the length of the horizontal vapor path, as above defined, is preferably from one to two times the width of that path (the dimension W of Fig. 2).

In some applications of the invention, an outer casing 28 may be found desirable, but it will usually suffice to stack the trays one within another as shown, and solder them together as described above to form a hermetically sealed column.

Operation

In operation, liquid enters the column through the inlet conduit 4 and discharges onto the imperforate strip 26 adjacent the perforated portion 16. The liquid thus discharged onto the topmost tray flows to the left, as seen in Fig. 1, across the perforated portion 16 and toward the drains 24 at the other end of the tray. Here the liquid discharges onto the imperforate strip 26 of the next tray below and flows across the perforated portion 16 of that tray to the right, as seen in Fig. 1, etc., downward through the column. Since the lower ends of drains 24 are submerged below the liquid level, vapor is compelled to flow upward through the perforated portions 16 of the trays, coming into intimate contact with the liquid as it passes through the perforations. As the vapor passes upward through the perforations and through the liquid which is flowing across the perforations, it may entrain some liquid droplets with it. Such liquid as may be thus entrained is separated out of the vapor stream by the action of gravity as the mixture flows horizontally across the tray and by the baffle of the next tray above as the vapor passes around the end of the baffle in order to reach the perforations of that tray. The path available to the vapor around the end of the baffle is such that the vapor will move along that path rather than through the fine perforations in the baffle, because the perforations in the baffles are so small that the surface tension of a film of liquid across the holes effectively blocks flow of gas therethrough. In moving around the end of the baffle, the vapor stream is subjected to sharp changes of direction which cause the remaining entrained liquid to drop out. The number and size of perforations in the perforated portion 16 of each tray is such that downward flow of liquid through the perforations is substantially prevented by the upward flow of vapor therethrough.

The advantages of a rectifying or fractionating column made according to this invention are economy of construction and improved efficiency of operation. In a column made according to this invention, there is a horizontal path along each tray of considerable length and substantial width and small height. The intimate mixing of liquid and vapor, which takes place as the vapor flows upward through the perforations of a tray and the liquid flowing across, is likely to result in the entrainment of some liquid by the vapor. The relatively long horizontal path associated with each tray along which vapor must flow in its general upward movement gives gravity a good opportunity to remove much of the entrained liquid, and the remainder is substantially completely removed by the baffle of the next tray.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a rectifying column, a plurality of vertically stacked trays, each tray comprising a shallow elongated pan member having a plurality of perforations through the bottom of the pan near one end only, a baffle beneath the pan and secured thereto adjacent the inner edge of the perforated portion and extending outward beyond the outer edge of the perforated portion, and a liquid drain at the end of the pan opposite the perforated end.

2. The column of claim 1, in which the trays are stacked so that the liquid drain of one tray empties into the perforated end of the next tray below.

3. The column of claim 2, in which the perforated portion of a tray is horizontally displaced from the discharge of the tray next above sufficiently so that said discharge empties onto an imperforate portion of tray bottom.

4. In a rectifying column, a plurality of vertically stacked trays, each tray comprising a shallow elongated pan member having a plurality of perforations through the bottom of the pan near one end only, a baffle secured to the underside of the pan member below the perforations in the pan bottom and extending outward beyond the outer edge of the perforated portion, and a liquid drain at the end of the pan opposite the baffle end.

5. The column of claim 4, in which the baffle is a flat member and is secured by one edge to the pan bottom near the inner edge of the perforated portion of the pan, the outer edge of the baffle being vertically spaced somewhat from the outer edge of the perforated portion of the pan.

6. The column of claim 5, in which the trays are stacked so that the liquid drain of one tray empties into the perforated end of the next tray below.

7. In a rectifying column, a plurality of vertically stacked trays, each tray comprising a shallow elongated pan member having a plurality of perforations through the bottom of the pan near one end, a perforated flat member constituting a baffle and having its inner edge secured to the pan bottom adjacent the inner edge of the perforated pan portion, the outer edge of the baffle being vertically spaced from the outer edge of the perforated pan portion and extending outward beyond the outer edge of the perforated portion, and a liquid drain at the end of the pan opposite the perforated end.

8. The column of claim 7, in which the trays are stacked so that the liquid drain of one tray empties into the perforated end of the next tray below.

9. In a rectifying column, a plurality of vertically stacked trays, each tray comprising a shallow elongated pan member having a perforated portion near one end immediately adjacent an imperforate strip, a baffle consisting of a flat member secured by one edge to the pan bottom near the inner edge of the perforated portion, the outer edge of the baffle being vertically spaced from the outer edge of the perforated portion and extending outward beyond the outer edge of the perforated portion, and a plurality of liquid drains at the end of the pan member opposite the perforated portion, the drains being aligned along an axis normal to the long axis of the pan, the trays being stacked so that the liquid drain of one tray empties onto the imperforate strip adjacent the perforated portion of the next tray below.

10. In a rectifying column, a plurality of vertically stacked trays, each tray comprising a shallow elongated pan member having a plurality of perforations through the bottom of the pan near one end, a baffle member secured by one edge to the underside of the pan bottom near the inner edge of the perforated portion of the pan and extending outward beyond the outer edge of the perforated portion, and a liquid drain at the end of the pan opposite the baffle end, the trays being stacked so that the perforated ends and drain ends alternate, the trays being so proportioned that the length of the horizontal vapor path across the column is at least five times the vertical distance between trays.

11. The column of claim 10, in which the length of said path is from one to two times its width.

12. A rectifying column as set forth in claim 9, in which the innermost edge of the perforated portion of each tray is spaced a substantial distance outward from the middle of the tray so that the stacked trays have a substantial length of imperforate tray bottom between perforated portions of adjacent trays.

SAMUEL C. COLLINS.

REFERENCES CITED

The following references are of record in the file of this patent:

UNITED STATES PATENTS

| Number | Name | Date |
|---|---|---|
| 243,197 | Perin | June 21, 1881 |
| 333,464 | Horan | Dec. 29, 1885 |
| 1,637,947 | Kotzebue | Aug. 2, 1927 |
| 1,748,704 | Chillas | Feb. 25, 1930 |
| 1,782,735 | Mackenzie | Nov. 25, 1930 |
| 1,950,313 | Linde | Mar. 6, 1934 |
| 2,055,048 | Puls | Sept. 22, 1936 |
| 2,116,933 | Ragatz | May 10, 1938 |
| 2,401,569 | Koch | June 4, 1946 |